United States Patent [19]

Chong et al.

[11] Patent Number: 5,790,791
[45] Date of Patent: Aug. 4, 1998

[54] APPARATUS FOR SYNCHRONIZING FLIGHT MANAGEMENT COMPUTERS WHERE ONLY THE COMPUTER CHOSEN TO BE THE MASTER RECEIVED PILOT INPUTS AND TRANSFERS THE INPUTS TO THE SPARE

[75] Inventors: Ray K. Chong, Mukilteo; Peter D. Gunn, Bellevue; Richard A. Herald, Lynnwood, all of Wash.

[73] Assignee: The Boeing Company, Seattle, Wash.

[21] Appl. No.: 440,563

[22] Filed: May 12, 1995

[51] Int. Cl.⁶ ............................................. G06F 13/00
[52] U.S. Cl. .................... 395/200.38; 395/200.4; 395/200.62; 395/200.78; 395/800.31; 395/182.1; 395/182.11; 395/182.13; 395/182.19; 364/132; 364/137; 364/187; 371/47.1; 371/48; 371/3; 371/5.4
[58] Field of Search ........................ 318/85; 326/38; 364/132, 137, 187, 405; 375/202; 395/182.08, 489, 182.09, 182.11, 182.21, 728, 200.38, 200.4, 200.62, 200.78, 800.31; 455/54.1

[56] References Cited

U.S. PATENT DOCUMENTS

| | | | |
|---|---|---|---|
| 4,347,563 | 8/1982 | Paredes et al. | 364/137 |
| 4,413,327 | 11/1983 | Sabo et al. | 395/469 |
| 4,415,973 | 11/1983 | Evans | 395/800 |
| 4,484,273 | 11/1984 | Stiffler et al. | 395/290 |
| 4,492,901 | 1/1985 | Higashi | 318/85 |
| 4,504,905 | 3/1985 | Burrage | 364/551.01 |
| 4,590,549 | 5/1986 | Burrage et al. | 364/131 |
| 4,591,976 | 5/1986 | Webber et al. | 395/182.18 |
| 4,739,335 | 4/1988 | Fourmand et al. | 395/182.08 |
| 4,977,500 | 12/1990 | Ogata et al. | 395/182.08 |
| 5,021,938 | 6/1991 | Hayakawa | 364/132 |
| 5,027,315 | 6/1991 | Agrawal et al. | 326/38 |
| 5,029,071 | 7/1991 | Kinoshita | 395/182.09 |
| 5,157,663 | 10/1992 | Major | 395/182.08 |
| 5,179,569 | 1/1993 | Sawyer | 375/202 |
| 5,185,693 | 2/1993 | Loftis et al. | 364/187 |
| 5,297,260 | 3/1994 | Kametani | 395/293 |
| 5,313,664 | 5/1994 | Sugiyama et al. | 364/405 |
| 5,450,576 | 9/1995 | Kennedy | 395/650 |
| 5,457,800 | 10/1995 | Howells et al. | 395/728 |
| 5,491,787 | 2/1996 | Hashemi | 395/182.09 |
| 5,491,788 | 2/1996 | Cepulis et al. | 395/182.11 |
| 5,511,232 | 4/1996 | O'Dea et al. | 455/54.1 |
| 5,530,946 | 6/1996 | Bouvier et al. | 395/182.21 |
| 5,644,700 | 7/1997 | Dickerson et al. | 395/182.07 |

FOREIGN PATENT DOCUMENTS

| | | |
|---|---|---|
| 0 205 274 | 12/1986 | European Pat. Off. . |
| 57182853 | 11/1982 | Japan . |
| 2 259 381 A | 3/1993 | United Kingdom . |
| WO 86/00439 | 1/1986 | WIPO . |

*Primary Examiner*—Thomas C. Lee
*Assistant Examiner*—Po C. Huang
*Attorney, Agent, or Firm*—Christensen, O'Connor, Johnson & Kindness PLLC

[57] ABSTRACT

A method and apparatus for choosing which flight management computer (FMC) of two FMCs will function as a master FMC (11) and which will function as a spare FMC (13) in maintaining data commonalty and synchronization between the master FMC (11) and the spare FMC (13) is disclosed. The status of a control switch (15) having FMC select and auto positions is scanned to determine the state of the switch. If the switch (15) is in an FMC select position, the related FMC is chosen to be the master FMC and the other FMC is chosen to be the spare FMC. If the switch is in the auto position, the failure status of the FMCs is evaluated. If one of the FMCs has failed, the other is chosen to be the master FMC. If the FMCs are both operating, the health of the FMCs is evaluated. If both FMCs are healthy, one is chosen to be the master FMC and the other is chosen to be the spare FMC, in accordance with a predetermined protocol. If the health of one of the FMCs has degraded, the other FMC is chosen to be the master FMC. Only the master FMC receives pilot data, which is forwarded to the spare FMC. The master FMC maintains object managers and sends changed data to the spare FMC when a data change occurs. The spare FMC stores the changed data within its own object managers.

32 Claims, 7 Drawing Sheets

APPARATUS FOR SYNCHRONIZING FLIGHT MANAGEMENT COMPUTERS WHERE ONLY THE COMPUTER CHOSEN TO BE THE MASTER RECEIVED PILOT INPUTS AND TRANSFERS THE INPUTS TO THE SPARE

FIELD OF THE INVENTION

This invention is directed to multiple computer systems and, more particular, to multiple computer systems wherein one computer is a back-up for another computer.

BACKGROUND OF THE INVENTION

Contemporary commercial jet transport airplanes include two flight management computers (FMCs) that operate in a dual configuration. That is, modern commercial jet transport airplanes, such as the Boeing Model 757, 767 and 747-400 airplanes, include two FMCs. The FMCs operate simultaneously in synchronization. That is, both FMCs receive, process and compare both stored data and data entered by the flight crew and by flight environmental sensors coupled to the FMCs. Data discrepancies between FMCs can trigger resynchronization during which FMC operations are suspended while the FMCs attempt to reestablish correct operational and data agreement. During resynchronization, flight crews are inhibited, i.e., locked out, from entering new and changed data. The lock-out time can equal 30 seconds or more. Obviously, a lock-out time of this magnitude is unacceptable to airplane pilots.

Prior attempts to solve the synchronization problem have focused on making the FMC's synchronization code more robust. While this has reduced the number of resynchronization events per flight hour, it has not entirely eliminated them. The present invention is directed to providing a method and apparatus that eliminates the lock-out problem associated with resynchronizing current flight management computer systems.

SUMMARY OF THE INVENTION

In accordance with this invention, a method and apparatus for: (i) automatically or manually choosing which flight management computer (FMC) of two FMCs will function as a master FMC and which will function as a spare FMC; and (ii) maintaining data commonalty and synchronization between the master FMC and the spare FMC are provided. In one form of the invention the status of a control switch having FMC select and auto positions is scanned to determine the state of the switch. If the switch is in an FMC select position, the related FMC is chosen to be the master FMC and the other FMC is chosen to be the spare FMC. If the switch is in the auto position, the failure status of the FMCs is evaluated. If one of the FMCs has failed, the other is chosen to be the master FMC. If the FMCs are both operating satisfactorily, the health of the FMCs is evaluated. If both FMCs are healthy, one is chosen to be the master FMC in accordance with a predetermined protocol. If the health of one of the FMCs has degraded, the other FMC is chosen to be the master FMC. Pilot input data commonalty is maintained by forwarding new data from the master FMC to the spare FMC upon receipt of the new pilot input data by the master FMC or when prior pilot input data is changed by the master FMC. The master FMC and the spare FMC are synchronized when data is forwarded or if the master FMC and the spare FMC become unsynchronized.

In accordance with alternative aspects of this invention, the control switch can be eliminated whereby a decision regarding which FMC will be chosen as the master FMC and will be chosen to be the spare FMC is automatically determined in accordance with the previously outlined procedure.

As will be readily appreciated from the foregoing description, the invention provides a new and improved method and apparatus for synchronizing flight management computers. Rather than a pair of FMCs both receiving, processing, comparing and storing the same data simultaneously and independently, only one of the FMCs interfaces with the flight crew to receive data. The second or spare FMC receives the data from the first or master FMC after the data is received by the master FMC, rather than simultaneously and independently. As required by events, the master and spare FMCs are synchronized in a way that does not result in a lock-out. As a result, the lock-out problem associated with the resynchronization of prior art dual flight management computer systems is eliminated.

BRIEF DESCRIPTION OF THE DRAWINGS

The foregoing features and aspects of this invention will become more readily appreciated as the same become better understood by reference to the following detailed description, when taken in conjunction with the accompanying drawings, wherein.

DETAILED DESCRIPTION OF THE PREFERRED EMBODIMENT

As will be better understood from the following description, in accordance with the invention, one of two flight management computers (FMCs) is designated a master FMC. The other is designated a spare FMC. During normal operation, the spare FMC receives the same pilot input and sensor input data as the master FMC. In addition, the spare receives master FMC synchronization data. Based on the received data, the spare FMC maintains a state of operation similar to the master FMC. As a result, transparent/seamless transfer of control from the master FMC to the spare FMC can occur in the event of a failure of the master FMC or flight/maintenance crew override. Because only one FMC (the master FMC) is in control at any one time (as opposed to two FMCs operating in agreement), resynchronization is not needed and, hence, will not occur. As a result, the FMCs are always available to receive data.

Figure 1:
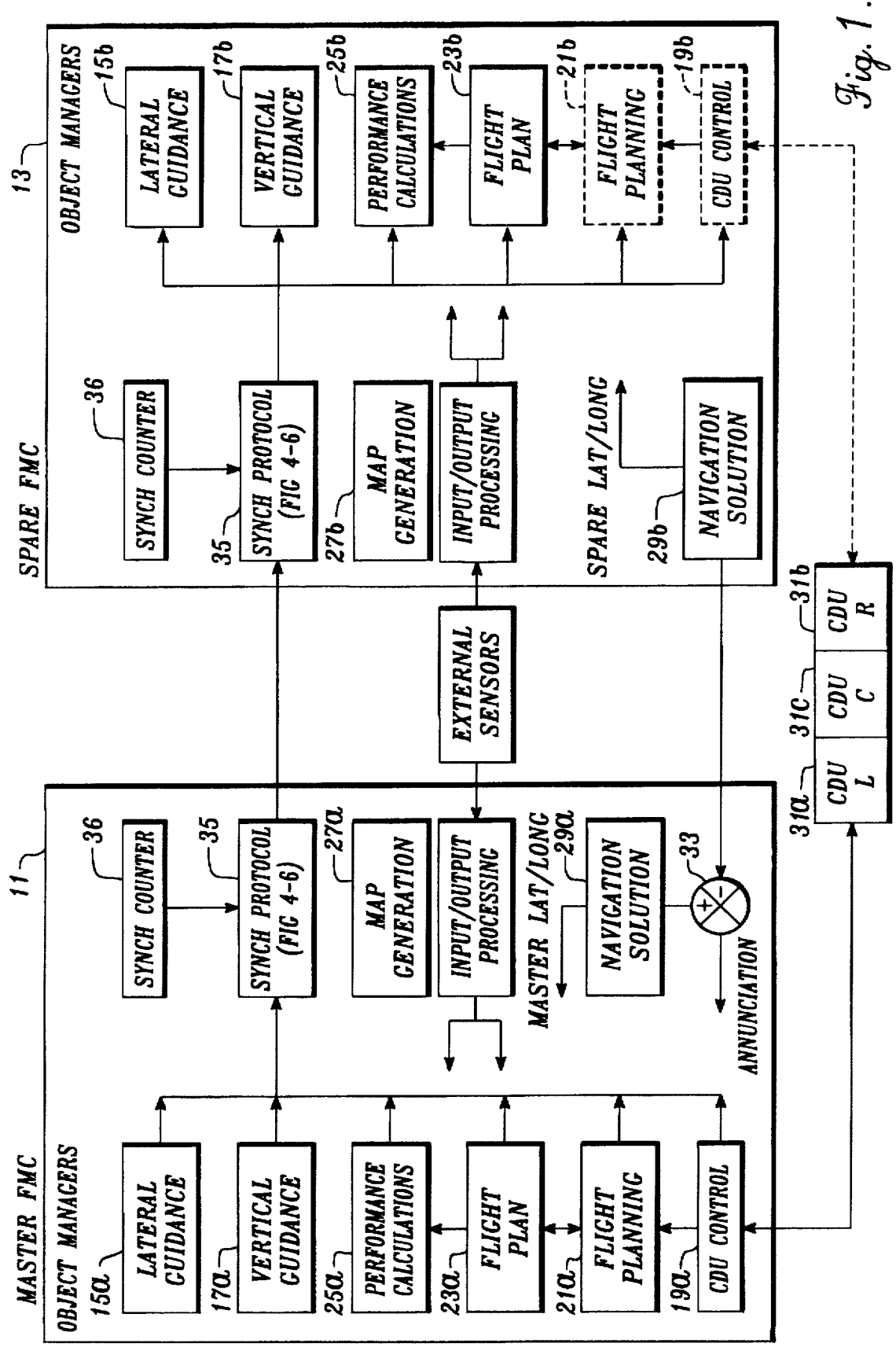
FIG. 1 is a pictorial, block diagram of two flight management computers coupled together in accordance with the invention.

FIG. 1 is a pictorial, schematic view illustrating a master FMC 11 and a spare FMC 13. As is conventional, both FMCs perform a plurality of functions. While not important to the present invention, some functions performed by the FMCs are pictorially depicted in FIG. 1 as object managers entitled lateral guidance 15a, 15b, vertical guidance 17a, 17b, CDU control 19a and 19b, flight planning 21a, 21b, flight plan 23a, 23b, performance calculations 25a, 25b, map generation 27a, 27b, navigational solution 29a, 29b. FIG. 1 also illustrates left, right and center control/display units (CDUs) 31a, 31b, and 31c. The left, right and center CDUs 31a, 31c and 31b are connected to the CDU control 19a of the master FMC 11. The CDU control 19b of the spare FMC is shown in phantom because it is inactive and, as a result, as shown by the dash line, signals do not flow from the left, right and center CDUs 31a, 31b, and 31c to the CDU control 19b of the spare FMC 13. The flight planning block of the spare FMC 13 is also shown in phantom because it is inactive. The remaining portions of the spare FMC, namely, the lateral guidance 15b, vertical guidance 17b, flight plan 23b, performance calculations 27b, map generation 27b and navigational solution 29b, are all active. Since the functions carried out by these blocks as well as the CDU and control and flight planning blocks are well known to those familiar with FMCs and do not form a portion of this invention, they are not described here.

As shown in FIG. 1, the navigational solution blocks of both the master and spare FMC 11 and 13 are both connected by a summer 33 whose output is applied to an annunciator (not shown). In a conventional manner, if the navigational solutions independently calculated by the master and spare FMCs 11 and 13 differ by a predetermined amount, e.g., 4 miles, the annunciation output enables a suitable visual and/or audible annunciator.

Figure 4:
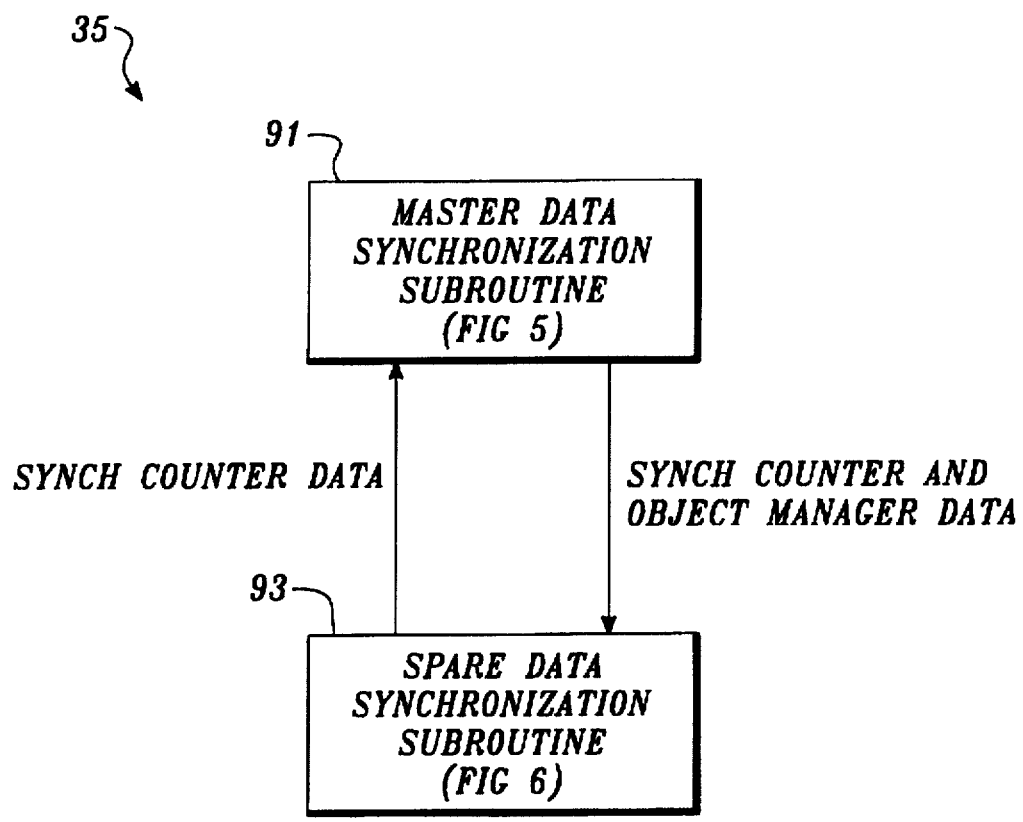
FIG. 4 is a block diagram showing how master and spare data synchronization subroutines, which form the sync protocol, are interrelated.
Figure 5:
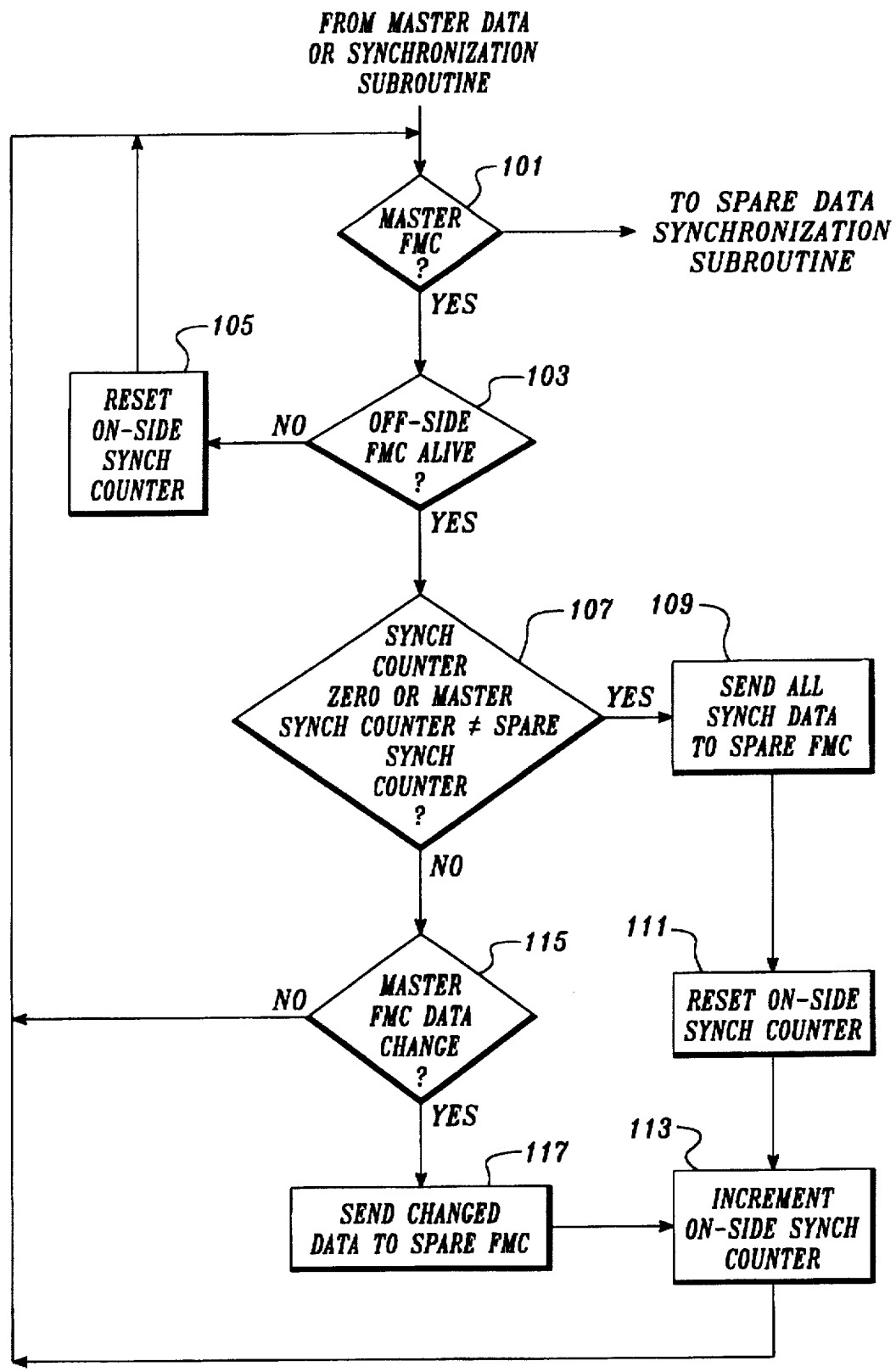
FIG. 5 is a flow diagram of a master data synchronization subroutine formed in accordance with the invention.
Figure 6:
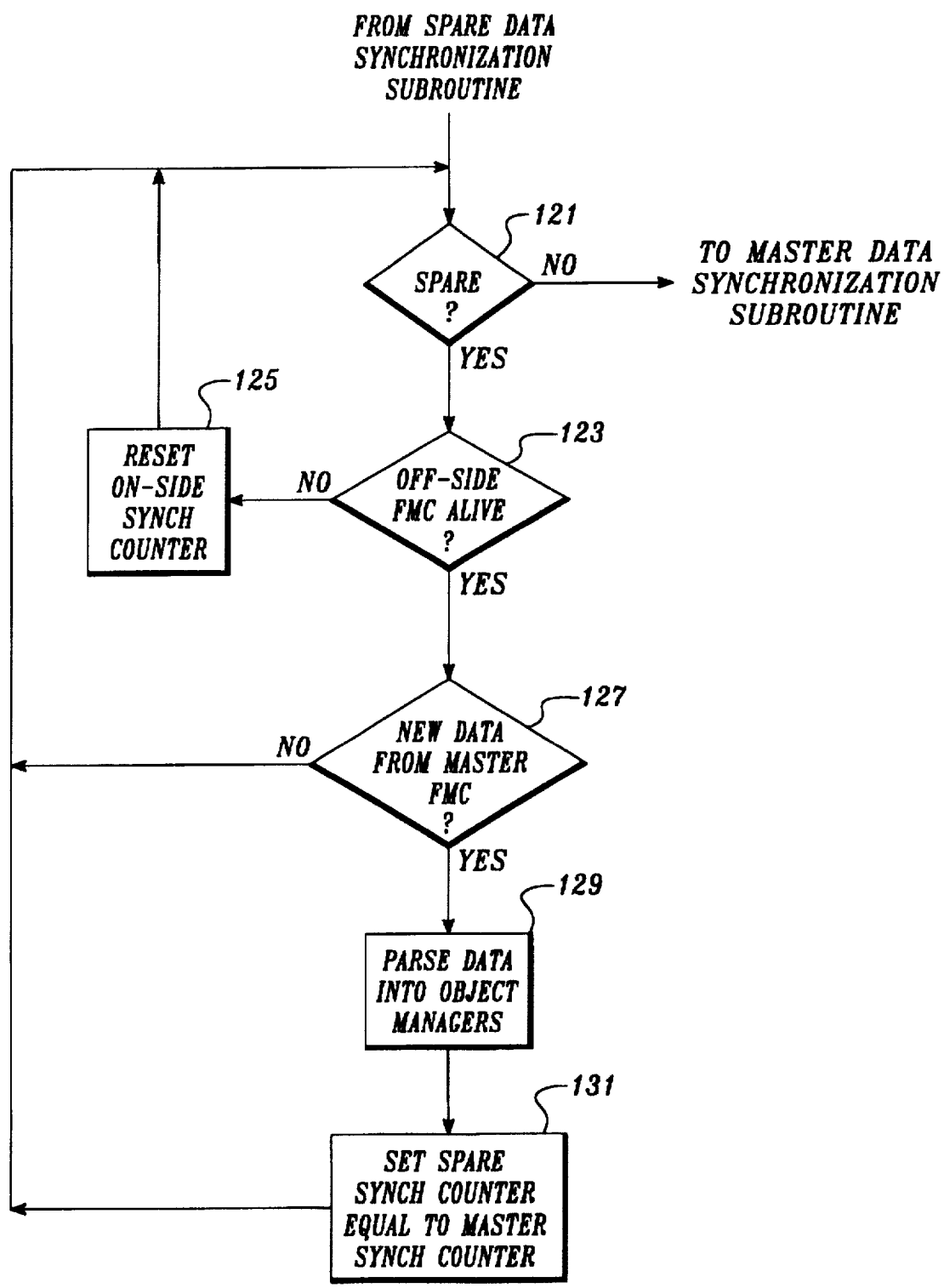
FIG. 6 is a flow diagram of a spare data synchronization subroutine formed in accordance with the invention.

The master FMC 11 and the spare FMC 13 are also illustrated as including a sync protocol 35 and a sync counter 36. The sync protocol is shown in FIGS. 4-6 and described below. The sync protocol includes master data and spare data synchronization subroutines that control the flow of pilot input and sensor data from the master FMC 11 to the spare FMC and the transmission of synchronization data between the master and spare FMCs 11 and 13. In this regard, as diagrammatically shown in FIG. 1, data received by the object managers 15a, 17a, ... of the master FMC 11 from one of the CDUs 31a, 31b or 31c is forwarded to the object managers 15b, 17b, ... of the spare FMC 13 by the sync protocol 35. How the sync protocol controls the transfer of data is described below.

Figure 2:
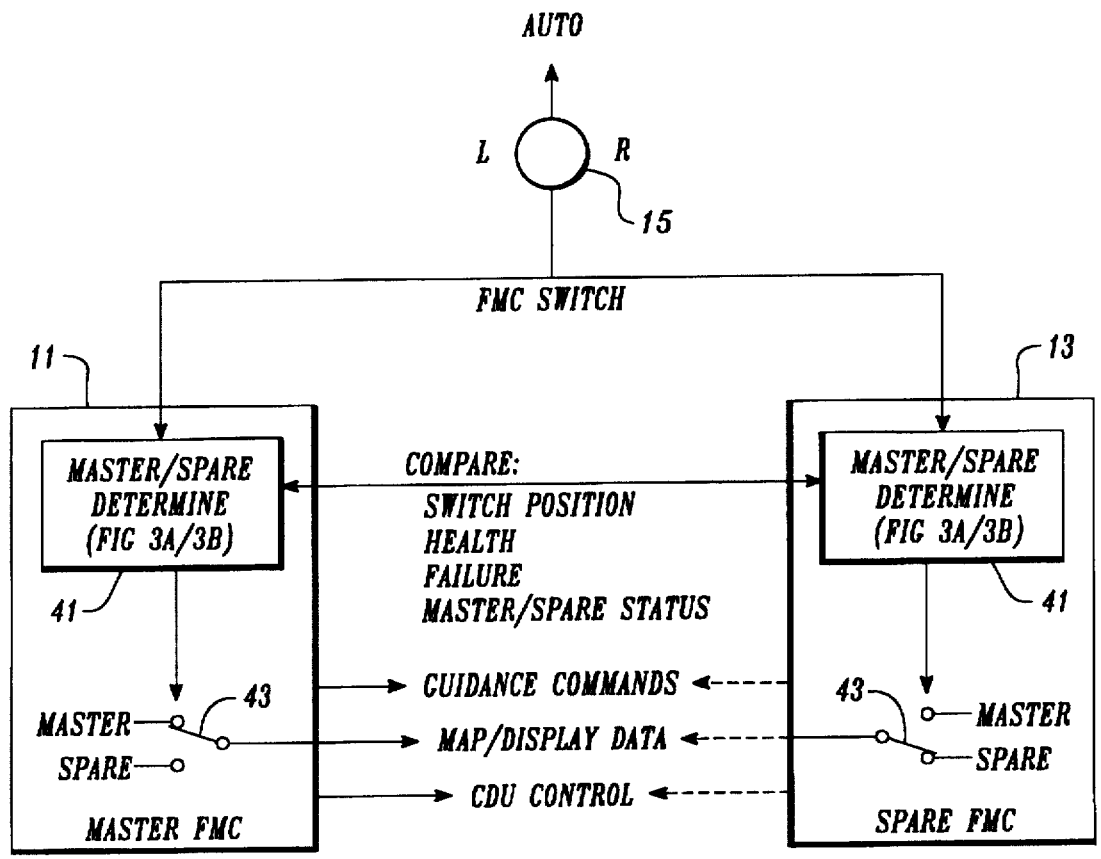
FIG. 2 is a schematic diagram of a control switch connected to a pair of FMCs for controlling the master/slave determination.

As illustrated in FIG. 2, preferably, the master and spare FMCs 11 and 13 are each connected to an FMC switch 15. The FMC switch 15 has three positions, a left position, a right position, and an auto position. Both the master and spare FMCs 11 and 13 sense or detect the position of the FMC switch 15. The position of the FMC switch is evaluated by a master determination program 41 illustrated in FIGS. 3A and 3B and described below. The master/spare determination program determines whether an FMC is to be a master FMC or a spare FMC. The master/spare FMC status is pictorially represented in FIG. 2 as the state of a master/spare switch 43 included in the master and spare FMCs 11 and 13. As pictorially illustrated in FIG. 2 by solid lines, guidance commands, map/displayed data, CDU control and other outputs are only produced by the master FMC and marked as usable data. As shown by the dashed lines, while these outputs are produced by the spare FMC 13, they are not marked as available to receiving subsystems. Finally, as will be better understood from the following description, the master/spare determination programs 41 are pictorially illustrated as coupled together so that they can compare or vote on the validity of switch position, health, failure and master/spare status data.

Figure 3A:
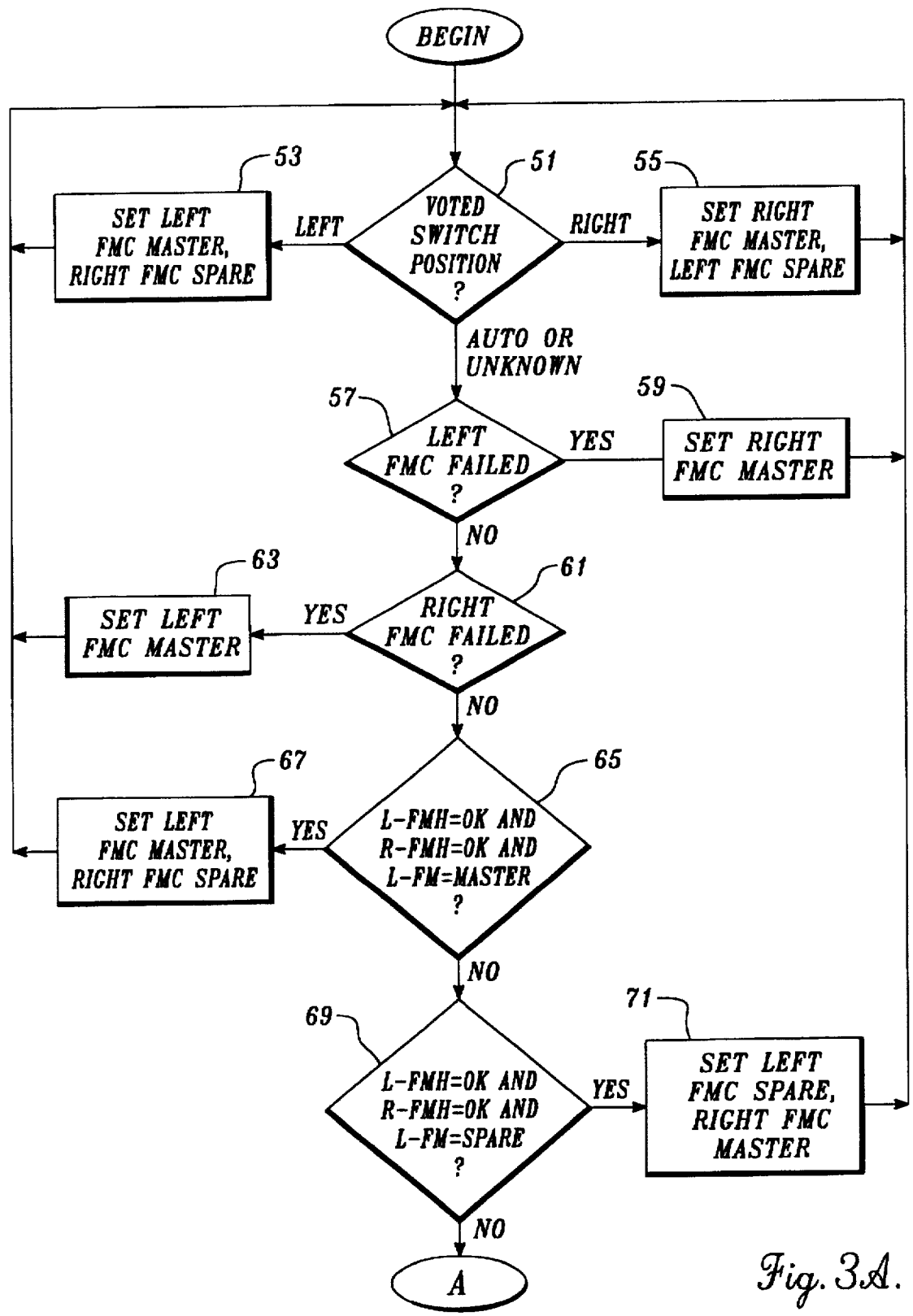
FIGS. 3A and 3B comprise a flow diagram illustrating how a master/spare determination is made in accordance with the invention.

The first step in the master/spare determination subroutine illustrated in FIG. 3A is test 51 to determine if the FMC switch 15 is in the left or right position. The test is made after the FMCs compare their switch position readings and vote on the state of the switch. If in the left position, the left FMC is chosen to be the master FMC and the right FMC is chosen to be the spare FMC. See block 53. If the switch is in the right position, the right FMC is chosen to be the master FMC and the left FMC is chosen to be the spare FMC. See block 55. If the position of the FMC switch 15 is unknown or if the FMC switch 15 is in the auto position, a test 57 is made to determine if the left FMC has failed. If the left FMC has failed, the right FMC is chosen to be the master FMC. See block 59. If the left FMC has not failed, a test 61 is made to determine if the right FMC has failed. If the right FMC has failed, the left FMC is chosen to be the master FMC. See block 63.

If the right FMC has not failed, a test 65 is made to determine if the health of the left FMC is okay (L–FMH= OK), the health of the right FMC is okay (R–FMH=OK) and if the left FMC is claiming to be the master FMC (L–FM= Master). If so, the left FMC is chosen to be the master FMC and the right FMC is chosen to be the spare FMC. See block 67. With respect to the left FMC claiming to be the master FMC, as will be appreciated by those familiar with flight management computers, both FMCs could claim to be the master FMC if the FMCs are energized at about the same time since, on power-up, each FMC would not be able to identify the other FMC as active and, thus, decide it was the master FMC. Under this set of conditions, the next pass through the master/spare determination program shown in FIGS. 3A and 3B would result in the left FMC being chosen to be the master FMC and the right FMC being chosen to be the spare FMC as a result of test 65 and block 67.

If the health of one or both of the FMCs is not okay and/or if the health of both FMCs is okay but the left FMC is not claiming to be the master FMC, a test 69 is made to determine if the health of the left and right FMCs is okay and if the left FMC is claiming to be the spare FMC. If so, the left FMC is chosen to be the spare FMC and the right FMC is chosen to be the master FMC. See block 71. As with both FMCs claiming to be the master FMC, under some conditions, both FMCs could claim to be spare FMCs. Under this set of conditions, the next pass through the master/spare determination program shown in FIGS. 3A and 3B would result in the left FMC being chosen to be the spare FMC under the right FMC chosen to be the master FMC as a result of test 69 and block 71.

Figure 3B:
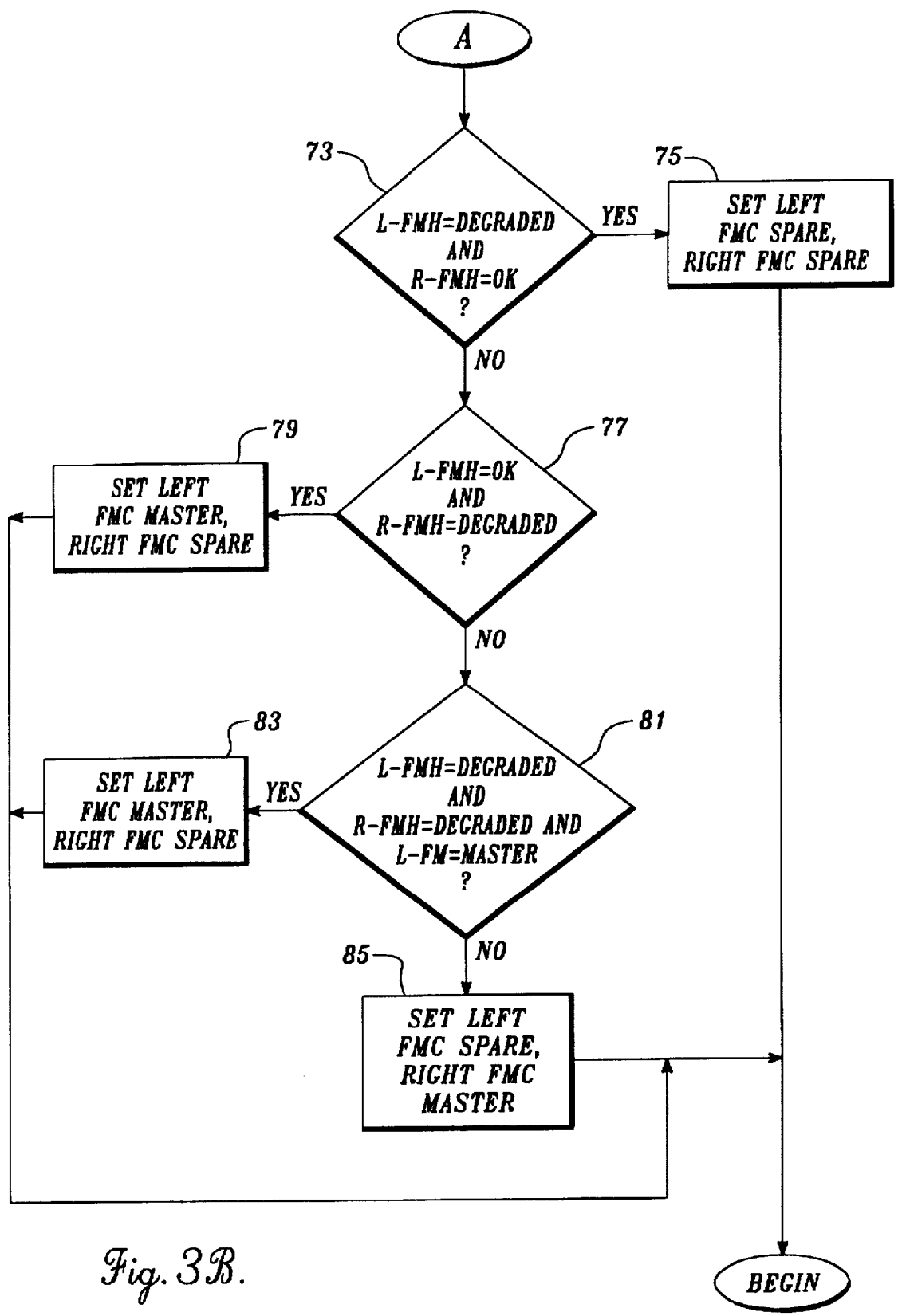

As shown in FIG. 3B, if the health of either of the FMCs has degraded, a test 73 is made to determine if the health of the left FMC has degraded (L–FMH=Degraded) and if the health of the right FMC is okay (R–FMH=OK). If so, the left FMC is chosen to be the spare FMC and the right FMC is chosen to be the master FMC. See block 75. Next a test 77 is made to determine if the health of the left FMC is okay (L–FMH=OK) and the health of the right FMC has degraded (R–FMH=Degraded). If so, the left FMC is chosen to be the master FMC and the right FMC is chosen to be the spare FMC. See block 79. If the health of both the left and right FMCs has degraded, a test 81 is made to determine if the left FMC is claiming to be the master FMC. If so, the left FMC is chosen to be the master FMC and the right FMC is chosen to be the spare FMC. See block 83. If not, the left FMC is chosen to be the spare FMC and the right FMC is chosen to be the master FMC. See block 85. As with tests 65 and 69, test 81 is designed to force a master/spare decision in situations where both FMCs are claiming to be the master FMC or where both are claiming to be the spare FMC.

As illustrated in FIGS. 3A and 3B, after master and left FMCs have been chosen, the program cycles to the beginning test and the cycle is repeated. As a result, any change of the status of the FMC switch, or failure or degradation of the master FMC, results in immediate transfer of master status from the existing master FMC to the spare FMC.

After a master/spare choice or selection has been made, as shown pictorially in FIG. 2, a software switch is set that prevents the spare FMC from receiving pilot CDU input and sensor data directly from the CDUs. Rather, as described below, pilot input data is sent from the master FMC to the spare FMC. The spare FMC independently uses sensor data to determine the present state, given the pilot inputs from the master FMC.

FIG. 4 illustrates the sync protocol 35 included in the master and spare FMCs 11 and 13 that controls the transfer of pilot input and sensor data from the master FMC 11 to the spare FMC and the synchronization of the spare FMC to the master FMC. As shown in FIG. 4, the sync protocol 35 includes a master data synchronization subroutine 91 and a spare data synchronization subroutine 93. A suitable master data synchronization subroutine is illustrated in FIG. 5, and a suitable spare data synchronization subroutine is illustrated in FIG. 6.

The master data synchronization subroutine illustrated in FIG. 5 begins with a test 101 to determine if the related FMC is the master FMC or the spare FMC. If the related FMC is not the master FMC, the program shifts to the spare synchronization subroutine illustrated in FIG. 6 and described below. If the FMC is the master FMC, a test 103 is made to determine if the other FMC, called the offside FMC, is alive. The terminology off-side FMC is used rather than spare FMC since the other FMC could also be claiming to be the master FMC. If the off-side FMC is not alive, the on-side sync counter is reset (see block 105), and the program returns to the master FMC test 101. The on-side sync counter is the sync counter of the FMC running the master data synchronization subroutine.

If the off-side FMC is alive, a test 107 is made to determine if the on-side sync counter is zero or if the count value of the master sync counter does not equal the count value of the spare sync counter. If the on-side sync counter is zero or the master sync counter value does not equal the spare sync counter value, sync data is sent from the master FMC to the spare FMC. See block 109. Thereafter, the on-side sync counter is reset. See block 111. Then, the on-side sync counter is incremented (see block 113), and the program cycles to the test 101 that determines whether the FMC is the master FMC.

If the on-side sync counter is not zero and the master sync counter value equals the spare sync counter value, a test 115 is made to determine if a data change has occurred in the master FMC. That is, a test 115 is made to determine if one or more of the object managers of the master FMC has received pilot input data from one of the CDUs or data from internal calculations or state changes. If no data change has occurred, the program cycles to the test 101 that determines if the FMC is the master FMC. If a data change has occurred, the changed data is sent to the spare FMC. See block 117. Thereafter, the on-side sync counter is incremented. See block 113. Then, the program cycles to the test 101 that determines whether the FMC is the master FMC.

The first step in the spare data synchronization subroutine illustrated in FIG. 6 is a test 121 to determine if the FMC is the spare FMC. If the FMC is not the spare FMC, the program cycles to the master data synchronization subroutine illustrated in FIG. 5 and described above. If the FMC is the spare FMC, a test 123 is made to determine if off-side FMC is alive. If off-side FMC is not alive, the on-side sync counter is reset. See block 125. If off-side FMC is alive, a test 127 is made to determine if new data has been received from the master FMC. If no new data has been received from the master FMC, the program cycles to the test 121 that determines whether the FMC is the spare FMC. If new data has been received from the master FMC, the data is transmitted to the various object managers illustrated in FIG. 1 and described above. Thereafter, the spare FMC sync counter is set equal to the master FMC sync counter (see block 131), after which the program cycles to the test 121 that determines whether the FMC is the spare FMC.

As will be readily appreciated from the foregoing description, the invention provides a new improved apparatus for synchronizing flight management computers that does not require resynchronization that could prevent flight crews from making data entries and changes. In accordance with the invention, one FMC of a pair of FMCs is chosen to be the master FMC while the other FMC is chosen to be the spare FMC. During normal operation, the master FMC receives pilot input and processes all data and is the controlling FMC. The spare FMC receives the same data as the master FMC plus master FMC synchronization data. However, the pilot input data is received from the master FMC, not directly from the pilots. Based on the data it receives, the spare FMC is able to maintain a state of operation similar to the master FMC; however, it is not in control. As a result, in the event of failure of the master FMC, transparent/seamless transfer of control from the master FMC to the spare FMC can take place. Likewise, a flight or maintenance crew can readily convert one FMC from master FMC status to spare FMC status and vice versa without loss of control. Since only one FMC is in control at any point in time, as opposed to two FMCs operating in agreement, resynchronization is not required and, hence, will not occur.

While the preferred embodiment of the invention has been illustrated and described, it will be readily appreciated by those skilled in the art and others that various changes can be made therein without departing from the spirit and scope of the invention as defined by the appended claims. For example, the FMC select switch 15 could be deleted and the FMC master/spare determination made entirely automatically, if desired.

The embodiments of the invention in which an exclusive property or privilege is claimed are defined as follows:

1. A method of choosing which flight management computer (FMC) of a pair of FMCs will function as a master FMC and which will function as a spare FMC and maintaining data commonalty and synchronization between the master FMC and the spare FMC comprising:

determining if either flight management computer (FMC) of a pair of FMCs has failed;

if one FMC has failed, choosing the other FMC to function as a master FMC and the failed FMC to function as a spare FMC;

if neither FMC has failed, choosing one FMC to function as a master FMC and the other to function as a spare FMC in accordance with a predetermined protocol;

supplying data to the FMC chosen to function as the master FMC;

forwarding data received by the FMC chosen to be the master FMC to the FMC chosen to be the spare FMC; and synchronizing the FMC chosen to be the spare FMC to the FMC chosen to be the master FMC.

2. The method claimed in claim 1 wherein said predetermined protocol includes:
   determining if said FMCs are healthy;
   determining if a selected one of said FMCs is claiming to be a master FMC; and
   choosing said selected one of said FMCs to function as said master FMC and the other FMC to function as said spare FMC if both of said FMCs are healthy and if said selected one of said FMCs is claiming to be a master FMC.

3. The method claimed in claim 2 wherein said predetermined protocol also includes:
   if both of said FMCs are healthy and if said selected one of said FMCs is not claiming to be a master FMC, determining if said selected one of said FMCs is claiming to be a spare FMC; and
   choosing said selected one of said FMCs to function as said spare FMC and the other FMC to function as said master FMC if both of said FMCs are healthy and if said selected one of said FMCs is claiming to be a spare FMC.

4. The method claimed in claim 3 wherein said predetermined protocol also includes:
   choosing the other of said FMCs to function as said master FMC if the health of one of said FMCs has degraded and choosing the FMC whose health has degraded to function as said spare FMC.

5. The method claimed in claim 4 wherein said predetermined protocol also includes:
   determining if a selected one of said FMCs is claiming to be a master FMC if the health of both of said FMCs has degraded; and
   choosing said selected one of said FMCs to function as said master FMC and the other FMC to function as said spare FMC if the health of both of said FMCs has degraded if said selected one of said FMCs is claiming to be a master FMC.

6. The method claimed in claim 1 wherein said predetermined protocol includes:
   if both of said FMCs are healthy, determining if a selected one of said FMCs is claiming to be a spare FMC; and
   choosing said selected one of said FMCs to function as said spare FMC and the other FMC to function as said master FMC if both of said FMCs are healthy and if said selected one of said FMCs is claiming to be a spare FMC.

7. The method claimed in claim 6 wherein said predetermined protocol also includes:
   choosing the other of said FMCs to function as said master FMC if the health of one of said FMCs has degraded and choosing the FMC whose health has degraded to function as said spare FMC.

8. The method claimed in claim 7 wherein said predetermined protocol also includes:
   determining if a selected one of said FMCs is claiming to be a master FMC if the health of both of said FMCs has degraded; and
   choosing said selected one of said FMCs to function as said master FMC and the other FMC to function as said spare FMC if the health of both of said FMCs has degraded if said selected one of said FMCs is claiming to be a master FMC.

9. The method claimed in claim 1 wherein said predetermined protocol includes:
   choosing the other of said FMCs to function as said master FMC if the health of one of said FMCs has degraded and choosing the FMC whose health has degraded to function as said spare FMC.

10. The method claimed in claim 9 wherein said predetermined protocol also includes:
    determining if a selected one of said FMCs is claiming to be a master FMC if the health of both of said FMCs has degraded; and
    choosing said selected one of said FMCs to function as said master FMC and the other FMC to function as said spare FMC if the health of both of said FMCs has degraded if said selected one of said FMCs is claiming to be a master FMC.

11. The method claimed in claim 1 wherein said predetermined protocol includes:
    determining if a selected one of said FMCs is claiming to be a master FMC if the health of both of said FMCs has degraded; and
    choosing said selected one of said FMCs to function as said master FMC and the other FMC to function as said spare FMC if the health of both of said FMCs has degraded, if said selected one of said FMCs is claiming to be a master FMC.

12. The method claimed in claim 1, wherein the FMCs include sync counters and wherein synchronizing the FMC chosen to be the spare FMC to the FMC chosen to be the master FMC comprises each FMC:
    determining if the determining FMC is a master FMC;
    if the determining FMC is a master FMC, determining if the other FMC is alive;
    if the other FMC is not alive, setting a sync counter in the determining FMC;
    if the determining FMC is not a master FMC, determining if the determining FMC is a spare FMC;
    if the determining FMC is a spare FMC, determining if the other FMC is alive; and
    if the other FMC is not alive, setting a sync counter in the determining FMC.

13. The method claimed in claim 12 includes the master FMC:
    determining if the sync counter of the determining FMC is zero or if the sync counter of the master FMC does not equal the sync counter of the spare FMC;
    if the sync counter of the determining FMC is not zero, and the sync counter of the master FMC equals the sync counter of the spare FMC, determining if the master FMC has updated data;
    if the master FMC has updated data, sending the updated data to the spare FMC; and
    incrementing the sync counter of the determining FMC.

14. The method claimed in claim 13 includes the master FMC sending synchronization data to the spare FMC if the sync counter of the determining FMC is zero or the sync counter of the master FMC does not equal the sync counter of the spare FMC.

15. The method claimed in claim 14 wherein the sync counter of the determining FMC is incremented after all sync data has been sent to the spare FMC.

16. The method claimed in claim 15 including the spare FMC:
    determining if new data has been sent from the master FMC;
    if new data has been sent from the master FMC, forwarding the data to the object managers of the spare FMC; and after the data has been sent to the object managers of the spare FMC, setting the sync counter of the spare FMC equal to the sync counter of the master FMC.

17. In a pair of flight management computers, the improvement comprising apparatus for choosing which flight management computer (FMC) of a pair of FMCs will function as a master FMC and which will function as a spare FMC, and for maintaining data commonalty and synchronization between the master FMC and the spare FMC, said improvement including:

each of said FMCs including a master/spare determination subroutine for determining if either of said flight management computers has failed and, if one FMC has failed, choosing the failed FMC to function as a spare FMC and choosing the other of said FMCs to function as a master FMC; and a sync protocol for controlling the transfer of data received by the FMC chosen to function as the master FMC from the pilot inputs to the FMC chosen to function as the spare FMC while inhibiting the FMC chosen to be the spare FMC from processing received data from said pilot inputs, and for synchronizing the FMC chosen to be the spare FMC to the FMC chosen to be the master FMC.

18. The improvement claimed in claim 17 wherein said master/spare determination subroutine includes:

determining if said FMCs are healthy;

determining if a selected one of said FMCs is claiming to be a master FMC; and choosing said selected one of said FMCs to function as said master FMC and the other FMC to function as said spare FMC if both of said FMCs are healthy and if said selected one of said FMCs is claiming to be a master FMC.

19. The improvement claimed in claim 18 wherein said master/spare determination subroutine also includes:

if both of said FMCs are healthy and if said selected one of said FMCs is not claiming to be a master FMC, determining if said selected one of said FMCs is claiming to be a spare FMC; and choosing said selected one of said FMCs to function as said spare FMC and the other FMC to function as said master FMC if both of said FMCs are healthy and if said selected one of said FMCs is claiming to be a spare FMC.

20. The improvement claimed in claim 19 wherein said master/spare determination subroutine also includes:

choosing the other of said FMCs to function as said master FMC if the health of one of said FMCs has degraded and choosing the FMC whose health has degraded to function as said spare FMC.

21. The improvement claimed in claim 20 wherein said master/spare determination subroutine also includes:

determining if a selected one of said FMCs is claiming to be a master FMC if the health of both of said FMCs has degraded; and choosing said selected one of said FMCs to function as said master FMC and the other FMC to function as said spare FMC if the health of both of said FMCs has degraded if said selected one of said FMCs is claiming to be a master FMC.

22. The improvement claimed in claim 17 wherein said master/spare determination subroutine includes:

if both of said FMCs are healthy, determining if a selected one of said FMCs is claiming to be a spare FMC; and choosing said selected one of said FMCs to function as said spare FMC and the other FMC to function as said master FMC if both of said FMCs are healthy and if said selected one of said FMCs is claiming to be a spare FMC.

23. The improvement claimed in claim 22 wherein said master/spare determination subroutine also includes:

choosing the other of said FMCs to function as said master FMC if the health of one of said FMCs has degraded and choosing the FMC whose health has degraded to function as said spare FMC.

24. The improvement claimed in claim 23 wherein said master/spare determination subroutine also includes:

determining if a selected one of said FMCs is claiming to be a master FMC if the health of both of said FMCs has degraded; and choosing said selected one of said FMCs to function as said master FMC and the other FMC to function as said spare FMC if the health of both of said FMCs has degraded if said selected one of said FMCs is claiming to be a master FMC.

25. The improvement claimed in claim 17 wherein said master/spare determination subroutine includes:

choosing the other of said FMCs to function as said master FMC if the health of one of said FMCs has degraded and choosing the FMC whose health has degraded to function as said spare FMC.

26. The improvement claimed in claim 25 wherein said master/spare determination subroutine also includes:

determining if a selected one of said FMCs is claiming to be a master FMC if the health of both of said FMCs has degraded; and choosing said selected one of said FMCs to function as said master FMC and the other FMC to function as said spare FMC if the health of both of said FMCs has degraded if said selected one of said FMCs is claiming to be a master FMC.

27. The improvement claimed in claim 17 wherein said master/spare determination subroutine includes:

determining if a selected one of said FMCs is claiming to be a master FMC if the health of both of said FMCs has degraded; and choosing said selected one of said FMCs to function as said master FMC and the other FMC to function as said spare FMC if the health of both of said FMCs has degraded if said selected one of said FMCs is claiming to be a master FMC.

28. The improvement claimed in claim 17, wherein the sync protocol comprises each FMC:

determining if the determining FMC is a master FMC;

if the determining FMC is a master FMC, determining if the other FMC is alive;

if the other FMC is not alive, setting a sync counter in the determining FMC;

if the determining FMC is not a master FMC, determining if the determining FMC is a spare FMC;

if the determining FMC is a spare FMC, determining if the other FMC is alive; and if the other FMC is not alive, setting a sync counter in the determining FMC.

29. The improvement claimed in claim 24 wherein the sync protocol includes the master FMC:

determining if the sync counter of the determining FMC is zero or if the sync counter of the FMC does not equal the sync counter of the spare FMC;

if the sync counter of the determining FMC is not zero, and the sync counter of the master FMC equals the sync counter of the spare FMC, determining if the master FMC has updated data;

if the master FMC has updated data, sending the updated data to the spare FMC; and incrementing the sync counter of the determining FMC.

30. The improvement claimed in claim 29 wherein the sync protocol includes the master FMC sending synchronization data to the spare FMC if the sync counter of the determining FMC is zero or the sync counter of the master FMC does not equal the sync counter of the spare FMC.

31. The improvement claimed in claim 30 wherein the sync counter of the determining FMC is incremented after all sync data has been sent to the spare FMC.

32. The improvement claimed in claim 31 wherein the sync protocol includes the spare FMC:

determining if new data has been sent from the master FMC;

if new data has been sent from the master FMC, forwarding the data to the object managers of the spare FMC; and after the data has been sent to the object managers of the spare FMC, setting the sync counter of the spare FMC equal to the sync counter of the master FMC.

* * * * *